United States Patent
Comstock

(10) Patent No.: US 8,160,956 B2
(45) Date of Patent: Apr. 17, 2012

(54) INSURANCE SYSTEM AND METHOD FOR A HIGH-RISK ASSET PURCHASER OR LESSEE

(76) Inventor: Thomas Franklin Comstock, Sarnia (CA)

( * ) Notice: Subject to any disclaimer, the term of this patent is extended or adjusted under 35 U.S.C. 154(b) by 1674 days.

(21) Appl. No.: 11/214,587

(22) Filed: Aug. 30, 2005

(65) Prior Publication Data

US 2006/0080241 A1     Apr. 13, 2006

Related U.S. Application Data

(60) Provisional application No. 60/606,089, filed on Aug. 31, 2004.

(51) Int. Cl.
 *G06Q 40/00* (2006.01)
 *G06Q 30/00* (2006.01)
(52) U.S. Cl. ............... 705/38; 705/4; 705/26.1; 705/35; 705/37; 705/40; 705/400
(58) Field of Classification Search ............... 705/4, 26, 705/35, 36, 36 R, 37, 38, 40, 400; 707/202
See application file for complete search history.

(56) References Cited

U.S. PATENT DOCUMENTS

| | | | | |
|---|---|---|---|---|
| 5,323,315 | A * | 6/1994 | Highbloom | 705/38 |
| 6,647,374 | B2 * | 11/2003 | Kansal | 705/37 |
| 2001/0037274 | A1 * | 11/2001 | Monticciolo | 705/35 |
| 2001/0037288 | A1 * | 11/2001 | Bennett et al. | 705/38 |
| 2002/0019804 | A1 * | 2/2002 | Sutton | 705/38 |
| 2002/0042770 | A1 * | 4/2002 | Slyke et al. | 705/37 |
| 2002/0046144 | A1 * | 4/2002 | Graff | 705/36 |
| 2002/0055900 | A1 * | 5/2002 | Kansal | 705/37 |
| 2002/0099618 | A1 * | 7/2002 | Stiberman | 705/26 |
| 2003/0033261 | A1 * | 2/2003 | Knegendorf | 705/400 |
| 2003/0041019 | A1 * | 2/2003 | Vagim et al. | 705/38 |
| 2003/0069837 | A1 * | 4/2003 | Mills et al. | 705/38 |
| 2003/0097329 | A1 * | 5/2003 | Nabe et al. | 705/38 |
| 2004/0107152 | A1 * | 6/2004 | Marlowe-Noren | 705/35 |
| 2004/0138997 | A1 * | 7/2004 | DeFrancesco et al. | 705/38 |
| 2004/0158521 | A1 * | 8/2004 | Newton et al. | 705/38 |

(Continued)

FOREIGN PATENT DOCUMENTS

WO     WO 03/017044     * 2/2003

OTHER PUBLICATIONS

Code of Federal Regulations, 12 C.F.R. 213.2(n), as per the provisions of this Part 213 that appear at 61 Fed. Reg. 52258, Oct. 7, 1996.*

(Continued)

*Primary Examiner* — Ella Colbert
*Assistant Examiner* — Barbara Amelunxen

(57) ABSTRACT

A method of financing a purchase or a lease a depreciating asset that includes determining a credit worthiness indication associated with a purchaser or lessee and establishing a finance contract for the lease or the purchase of the depreciating asset. A dealer is a guarantor of the finance contract. The method further includes issuing an insurance policy for a benefit of the dealer based on a liability associated with being the guarantor. The liability is based on at least the creditworthiness indication and a value of the depreciating asset. The method also includes paying a payment associated with the finance contract. A portion of the payment based on a cost of the purchase or the lease of the depreciating asset and a cost associated with the insurance policy.

15 Claims, 3 Drawing Sheets

U.S. PATENT DOCUMENTS

| | | | |
|---|---|---|---|
| 2005/0096945 A1* | 5/2005 | Wharton, III | 705/4 |
| 2005/0235008 A1* | 10/2005 | Camping et al. | 707/202 |
| 2005/0273429 A1* | 12/2005 | Deckoff | 705/40 |
| 2005/0289036 A1* | 12/2005 | LaCombe et al. | 705/35 |
| 2006/0010052 A1* | 1/2006 | Willingham | 705/35 |
| 2006/0080241 A1* | 4/2006 | Comstock | 705/40 |
| 2006/0085334 A1* | 4/2006 | Murphy | 705/40 |
| 2006/0253386 A1* | 11/2006 | Rothman et al. | 705/38 |
| 2006/0287892 A1* | 12/2006 | Jones et al. | 705/4 |
| 2007/0011083 A1* | 1/2007 | Bird et al. | 705/38 |
| 2007/0203800 A1* | 8/2007 | Opyd, III | 705/26 |
| 2007/0233591 A1* | 10/2007 | Newton et al. | 705/36 R |
| 2007/0288271 A1* | 12/2007 | Klinkhammer | 705/4 |

OTHER PUBLICATIONS

Merriam-Webster Online Dictionary, 10$^{th}$ Ed., Def. "associated", "reinsurance".*

The Federal Reserve Board, Keys to Vehicle Leasing, Quick Consumer Guide, Publ. May 5, 2003.*

Anynomous, PR Newswire, The First American Corporation Reports Financial Results for the First Quarter of 2008;—Reports Income per Diluted Share of 32 Cents—New York, May 1, 2008.*

* cited by examiner

INSURANCE SYSTEM AND METHOD FOR A HIGH-RISK ASSET PURCHASER OR LESSEE

CROSS-REFERENCE TO A RELATED APPLICATION

This application claims the benefit of U.S. Provisional Application No. 60/606,089, filed on Aug. 31, 2004. The disclosure of the above application is hereby incorporated by reference as if fully set forth herein.

FIELD

The present teachings relate to a financing system and method and more particularly relate to an insurance system and method to cover a liability for a party to a loan used to purchase or lease a depreciating asset.

BACKGROUND

Typically, a consumer who chooses to purchase a new vehicle may seek financing in the form of a loan or lease because of an inability to tender payment in full at a time of purchase. Upon purchase, the new vehicle begins depreciating immediately. Payments toward the loan, however, are tendered in consecutive installments. In one example, only twelve payments may have been tendered when the consumer defaults on the loan. In this situation, the lender who made the loan may choose to repossess the vehicle. Upon repossession, the lender may seek reimbursement from the consumer for an outstanding balance on the loan. The outstanding balance may in part be due to the value of the vehicle 14 being less than the outstanding balance on the loan.

To reduce the lender's exposure to the risk of having the outstanding balance on the loan not satisfied by sale of the repossessed vehicle, lenders typically will assess the credit worthiness of the consumer prior to extending the loan. In some situations, the credit worthiness of the consumer is below a threshold level such that a top-tier lender will refuse to offer financing to the consumer. With that said, loans through top-tier lenders may enhance the credit worthiness of the consumer based on a payment history associated with the loan. The payment histories (i.e., payment toward the loan) are reported to credit reporting bureaus and thus favorable payment histories may improve the consumer's credit.

When the consumer is unable to take advantage of the top-tier lender, the consumer may turn to lending agencies that do not provide the same benefits as the top-tier lending agencies. Moreover, the purchaser may be unable to acquire a new vehicle due to the inaccessibility of lease or finance programs due to aforesaid credit worthiness thresholds. The ability to purchase a new vehicle for relatively less money than it may cost to maintain an older vehicle benefits the consumer and benefits the dealer and its associated companies.

SUMMARY

The present teachings generally include a method of financing a purchase or a lease a depreciating asset. The method includes determining a credit worthiness indication associated with a purchaser or lessee and establishing a finance contract for the lease or the purchase of the depreciating asset. A dealer is a guarantor of the finance contract. The method further includes issuing an insurance policy for a benefit of the dealer based on a liability associated with being the guarantor. The liability is based on at least the credit-worthiness indication and a value of the depreciating asset. The method also includes paying a payment associated with the finance contract. A portion of the payment based on a cost of the purchase or the lease of the depreciating asset and a cost associated with the insurance policy.

Further areas of applicability of the present teachings will become apparent from the detailed description provided hereinafter. It should be understood that the detailed description and specific examples, while indicating the various embodiments of the present teachings, are intended for purposes of illustration only and are not intended to limit the scope of the teachings.

BRIEF DESCRIPTION OF THE DRAWINGS

The present teachings will become more fully understood from the detailed description, the appended claims and the accompanying drawings, wherein:

DETAILED DESCRIPTION OF THE VARIOUS EMBODIMENTS

The following description of the various embodiments is merely exemplary in nature and is in no way intended to limit the teachings, their application, or uses.

Figure 1:
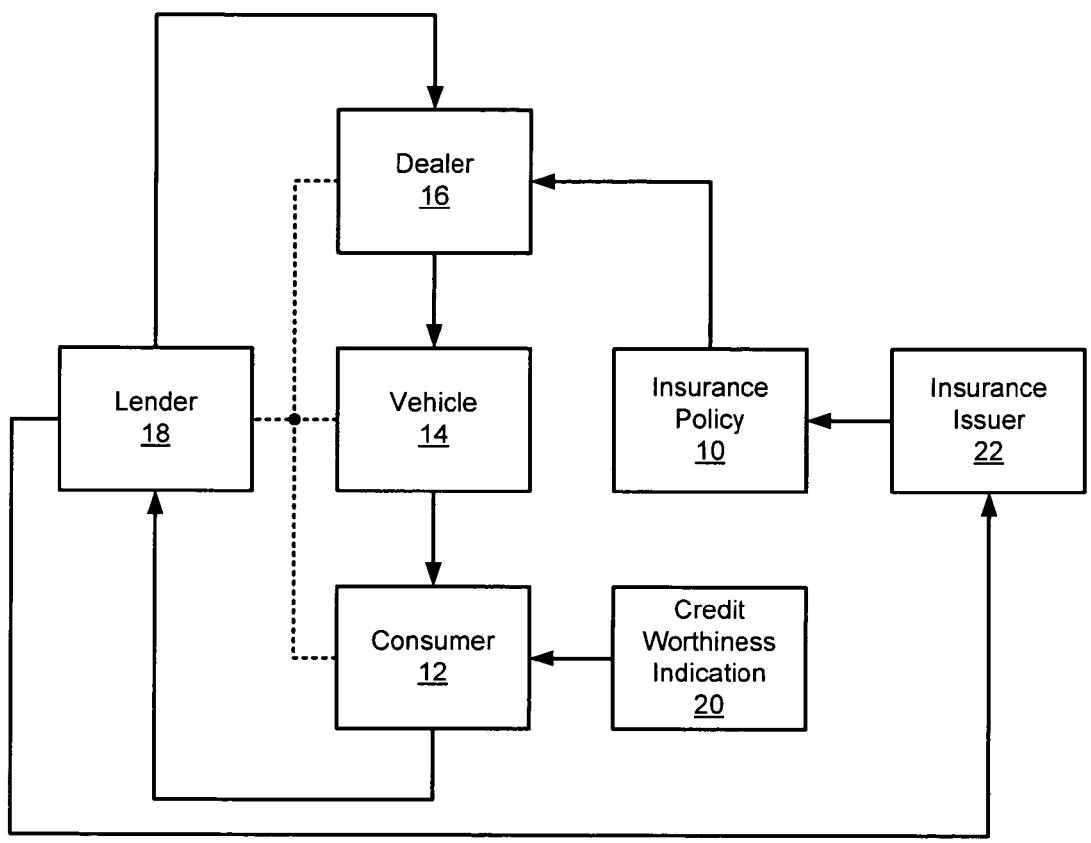
FIG. 1 is a diagram representing a financing arrangement using an insurance policy in accordance with the present teachings.

With reference to FIG. 1, an insurance policy 10 may be issued to cover a liability of a party in a financial arrangement to purchase or lease a depreciating asset in accordance with the present teachings. The insurance policy 10 may have a face value, a purchase price and a beneficiary. Upon an occurrence of a condition associated with the insurance policy 10, the beneficiary is paid the face value of the insurance policy 10. In one example, repossession of the asset by a party associated with the financial arrangement triggers a condition to pay the face value of the insurance policy 10.

The insurance policy 10 may be used in various financial arrangements. In one example, a consumer 12 may lease or purchase a vehicle 14 from a dealer 16. The insurance policy 10 may be used to obtain a loan, a lease or other suitable financial arrangement to purchase or lease the vehicle 14 or any form of depreciating asset. The vehicle 14 may be a car, a truck, a boat, a plane, a motorcycle, a motor home, other depreciating assets and combinations thereof. It will be appreciated that the insurance policy 10 may take other suitable forms such as a contract to reimburse or contract for payment that contains a condition subsequent such when the condition occurs a party is paid a predetermined value.

Unless the consumer 12 tenders payment in full to the dealer 16, the consumer 12 may obtain the loan or the lease to acquire the vehicle 14 from a lender 18. The lender 18 will pay the dealer 16 in full for the lease or purchase price of the vehicle 14 in return for installments (e.g., monthly payments) from the consumer 12. It will be appreciated that the lease or the loan may take the form of other suitable financing contracts and the title of the vehicle 14 may remain with various parties to the finance contract and/or various parties may secure a lien against the vehicle 14 to otherwise ensure performance under the financial contract.

During a process for applying for the loan, the lender 18 and/or the dealer 16 may obtain a credit worthiness indication 20 of the consumer 12. The credit worthiness indication 20 may indicate the ability of the consumer 12 to pay for the vehicle 14 and may also indicate a propensity of the consumer 12 to experience a default (i.e., failure to make payment), which may result in a repossession of the vehicle 14. The credit worthiness indication 20 of the consumer 12 may be based on various factors including, but not limited to, credit scores, credit histories, payment histories, net worth, savings, other assets and other suitable indicators and combinations thereof.

Typically top tier lenders refrain from offering the loan or the lease, when the credit worthiness indication 20 is unfavorably low. Top tier lenders may include, for example, Ford Motor Credit, GMAC Financing, etc. Other lenders (i.e., non-top tier lenders) may offer financing but usually at relatively less advantageous terms for the consumer 12.

In one example, the dealer 16 may serve as a guarantor or surety for the loan from the lender 18 to the consumer 12. In this arrangement, if the consumer 12 defaults on the loan or a repossession of the vehicle 14 occurs, the lender 18 is able to seek reimbursement from the dealer 16 for remaining balance of the loan not otherwise satisfied by sale (auction or otherwise) of the vehicle 14. The insurance policy 10 may be purchased by (or for) the consumer 12 and may cover a liability. The liability is based on the possibility that the need arises to reimburse the dealer 16 as the guarantor.

It will be appreciated that the lender 18 may repossess the vehicle 14 when a default occurs on the loan, the lease or other financial contract. The lender 18 may then sell (auction or otherwise) the vehicle 14 to seek to recover funds owed to the lender per the loan, the lease or other financial contract. If the sale of the vehicle 14 does not cover the balance of the loan, the lease or other financial contract, the lender 18 may seek reimbursement from the consumer 12 and/or the dealer 16, which is illustrated by the dashed lines in FIG. 1. The dealer 16, as the guarantor of the loan, the lease or other financial contract may seek payout of the insurance policy 10 to pay the reimbursement sought from the lender 18 and thus satisfy the remaining balance of the loan, the lease or other financial contract.

Repossession therefore may serve as an event that when it occurs satisfies a condition in the insurance policy 10, such that the beneficiary of the insurance policy 10 is paid the face value of the insurance policy 10. In this example, the face value of the insurance policy 10 is about equal to the remaining balance of the loan or the lease minus the value of the vehicle realized upon a sale because of the repossession. The insurance policy 10 therefore permits the consumer 12 with the credit worthiness indication 20 that is relatively poor (i.e., a higher propensity for repossession) to acquire a new vehicle through the top tier lender using the insurance policy 10.

In one example, a lease price is determined for a new vehicle using the insurance policy 10. The lease price is typically based on a residual value of the vehicle, which necessarily includes the anticipated depreciation of the vehicle. The consumer 12 and/or the dealer 16 associate with the lender 18 to apply for and provide the lease.

The lender 18 may deny application for the loan or the lease based on the credit worthiness indication 20. The consumer 12 and/or the dealer 16 may contact an insurance issuer 22 and share with the insurance issuer 22 some or all of the information from the credit worthiness indication 20 of the consumer 12. In this regard, the dealer 16 may become the guarantor for the loan or the lease between the lender 18 and the consumer 12. The insurance issuer 22 then determines a purchase price for the insurance policy 10 such that the face value of the insurance policy will about cover the liability of the dealer 16 if asked to reimburse costs associated with being the guarantor of the loan or the lease.

In one example, the liability of the dealer 16, when asked to reimburse costs associated with being the guarantor of the loan or the lease, may change over time as the amount of principle and interest paid as well as the value of the vehicle 14 fluctuates over time. In this regard, the insurance policy 10 and more specifically the face value of the insurance policy 10 may change over time to be commensurate with the liability faced by the beneficiary, namely the dealer 16. In other examples, the insurance policy 10 may have a fixed value such that when the repossession of the vehicle 14 occurs (or other triggering event), a fixed amount is paid to the beneficiary. It will be appreciated that various combinations of fixed and/or floating face values may be used in support of various forms of finance contracts.

Upon consent of the parties, the lender 18 pays the dealer 16 a capitalized cost for the loan or the lease. The capitalized costs may include the lease or the purchase price of the vehicle 14, the purchase price of the insurance policy 10, taxes, fees and/or other costs associated with transaction. In return, the consumer 12 is obligated to make loan payments to the lender 18 over a period (e.g., 5 years) to pay a principle and an interest associated with the loan.

Figure 2:
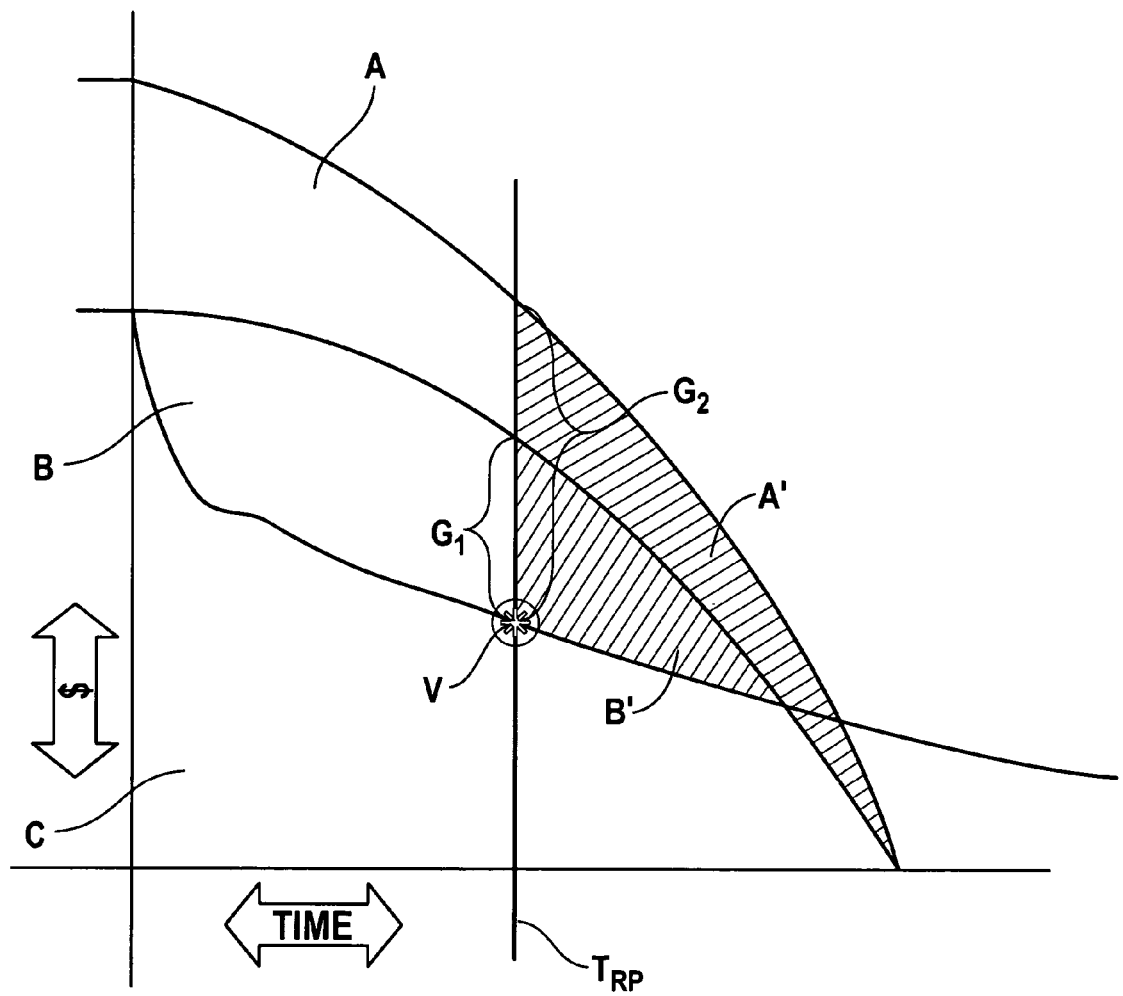
FIG. 2 is a diagram representing a value of a loan relative to the value of an associated asset in accordance with present teachings.

With reference to FIG. 2, a diagram depicts the possible remaining balance on the loan or the lease based on a time of repossession of the vehicle 14 (FIG. 1). Region A depicts the amount of money paid (or owed) to the lender in interest over time. Region B depicts the amount of money paid (or owed) to the lender in principle over time. Region C depicts the depreciating value of the vehicle over time. A time of repossession ($T_{RP}$) graphically indicates that vehicle was repossessed and the remaining principle, indicated by Region B', is greater then the value of the vehicle indicated by Region C. A gap ($G_1$) between the principle (Region B) and the value of the depreciated asset (Region C) is a graphical representation of the lender's risk, which in turn is at least the dealer's risk as guarantor for the debt associated with the lease or the loan.

The insurance policy 10 however mitigates the risk because in the event of repossession, the insurance policy 10 is paid such that the face value of the policy covers the gap ($G_1$) and thus eliminates the risk to the dealer 16. In this regard, the dealer 16 pays the lender 18 an amount of money to cover the gap ($G_1$), which represents the remaining balance after the vehicle 14 is sold (auctioned or otherwise) for a value (V) associated with the vehicle 14.

In another example, a gap ($G_2$) between the interest (Region A) and the value of the depreciating asset (Region C) is a graphical representation of the lender's risk, which in turn is at least the dealer's risk as guarantor for the debt associated with the lease or the loan. In this regard, the insurance policy 10 pays the lender 18 an amount of money to cover the gap $G_2$, which represents the remaining principle balance (Region B') and remaining interest payments (Region A') after the vehicle 14 is sold (auctioned or otherwise) for a value (V) associated with the vehicle 14.

When the dealer 16 is willing to be the guarantor or surety for the loan, the dealer 16 may sell more vehicles 16 to consumers 12, who may otherwise not qualify for a traditional financing arrangement with a top-tier lender. The consumer 12 may now be able to lease (or buy) a new vehicle 14 that typically has a factory warranty and lower maintenance costs. The consumer 12 obtains the loan or the lease from the top tier lender, which may benefit the consumer 12 because payment histories are reported to the credit bureaus and may increase the credit worthiness indication 20.

In one example, the purchase price of the insurance policy 10 is determined based on the credit worthiness indication 20 of the consumer 12 and the cost of the vehicle 14. More specifically, a score bias is determined based on at least the credit worthiness indication 20. The insurance issuer 22 may use the score bias to determine the purchase price of the insurance policy 10. The score bias increases (i.e., increases the cost of the insurance policy 10), when credit worthiness indication 20 is relatively less favorable (e.g., includes bankruptcies, balances owed, etc.). A more favorable credit worthiness indication may provide a less expensive insurance policy. Naturally, if the credit worthiness indication 20 is sufficiently favorable, the insurance policy 10 may not be necessary.

In one example, the score bias may be quantified and be based on, among other things, a credit score. The credit score of the consumer 12 is readily available from various sources. Table 1 below shows exemplary score bias values based on a range as follows:

TABLE 1

| Exemplary Score Bias | Credit Score Range |
| --- | --- |
| 950 | greater than 600 |
| 1050 | about 550-about 599 |
| 1200 | about 500-about 549 |
| 1300 | about 450-about 499 |
| 1350 | about 425-about 449 |
| 1400 | about 400-about 424 |

The purchase price of the insurance policy 10, which may be a component of the purchase or lease price of the vehicle 14 may be determined using the score bias with the following equation:

$$\text{Score Bias} - \text{Credit Score}/1000 \times \{(CC-LEV)/2\} = \text{Purchase Price}$$

"CC" defines the capitalized cost associated with the loan or the lease. "LEV" defines a lease end value or a residual value of the vehicle 14, which may be determined by the lender 18 and/or the dealer 16. In a purchase arrangement, it will be appreciated that the residual value of the vehicle may not be applicable.

Figure 3:
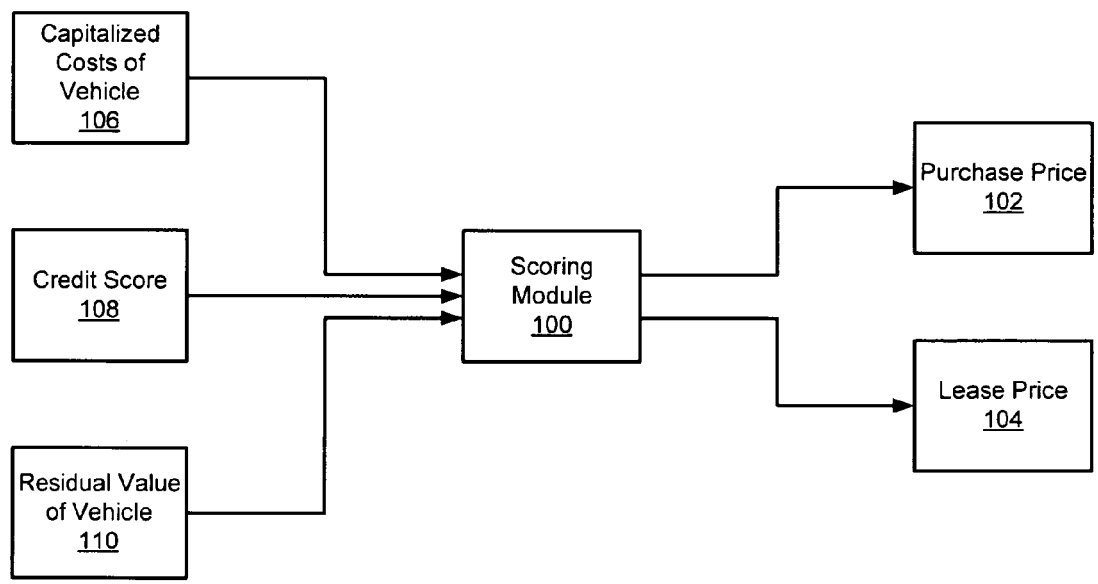
FIG. 3 is a schematic of a scoring module associated with the insurance policy in accordance with the present teachings.

In one example and with reference to FIGS. 1 and 3, a software-based scoring module 100 may be used to implement the present teachings. The scoring module 100 may be used to determine a purchase price 102 or a lease price 104, a component of which may be the cost of the insurance policy 10, based on capitalized costs 106 of the vehicle 14, the credit worthiness indication 20, which may include a credit score 108 and/or a residual value 110 of the vehicle 14. The capitalized costs 106 may include not only the lease price or purchase price (not including the cost of the insurance policy 10) of the vehicle 14 but may also account for taxes, fees, interests, underwriting charges, etc. It is to be understood that only the relevant computations of the scoring module 100 are discussed, but that other software-implemented instructions may be needed to control and manage the overall operation of the system and/or module.

For example, the consumer 12 (FIG. 1) has a credit score of 510. The consumer 12 may not be able to obtain financing from the top-tier lender for lease or purchase of the vehicle 14. With the insurance policy 10, however, the consumer 12 would be able to lease or purchase the vehicle 14 because the dealer 16 is willing to be the guarantor of the loan if the insurance policy 10 is purchased by the consumer 12 for the benefit of the dealer 16. The insurance policy 10 has a sufficient face value to cover the possibility of the reimbursement costs associated with being the guarantor. The consumer 12 using the insurance policy 10 may lease the vehicle 14 for predetermined period, e.g., three years.

With reference to FIGS. 1 and 3, the dealer 16, the lender 18 and/or the insurance issuer 22 may use the scoring module 100 to determine a purchase price 102 and/or a lease price 104, from which an installment payment may be determined for the loan or the lease. The scoring module 100 may determine the purchase price 102 and/or the lease price 104 based on at least a capitalized cost of the vehicle 106 and a credit score 108. The scoring module 100 may also determine the purchase price 102 and/or the lease price 104 based on a residual value of the vehicle 110.

In one example, the capitalized cost of the vehicle 106 may be about $20,000. The residual value of the vehicle 110 may be about $12,800. The credit score 108 based on the credit worthiness indication 20 (FIG. 1) may be 510. Without the insurance policy 10, the monthly cost of the vehicle 14 would be about $200, when the consumer 12 is able to obtain the loan or the lease from the top tier lender. With the insurance policy 10 and the credit score of 510, the installment payment for a lease with the insurance policy 10 would be about an extra $69.00 per month. As such, the consumer 12 is able to lease a new vehicle from the dealer for $269.00 per month, which only $69 per month more than a typical lease agreement. With the insurance policy 10, no co-signer is needed, no more money down is necessary and interest rates do not need be increased to reflect the credit score as typically done.

In one example, the insurance policy 10 may also include a feature that pays the consumer 12 a refund of the purchase price of the insurance policy 10 if the loan or the lease is paid in full and no installment payments have been made outside of the agreed terms (e.g., late payments). The refund may be paid as installments during the loan or the lease as incentives or may be paid as a lump sum at the end of the loan or lease period.

In one example, the insurance policy 10 may include a quarantine period, which may be a period about equal to the length of time necessary to complete the first twelve payments of the loan or the lease. In the quarantine period the lender 18 and/or the insurance issuer 22 may be able to pursue the consumer 12 and/or the dealer 16 for outstanding balance on the loan or the lease should a repossession of the vehicle 14 occur.

In a further example, the insurance policy 10 may include an extended quarantine period. As such, the loan or the lease may still be in good standing, notwithstanding some payments may have been made late. Should missed payments result in repossession at a later date (outside of the above quarantine period), the insurance issuer 22 and/or the lender 18 may maintain the right to pursue the consumer 12 for the balance of the loan or the lease.

In one example, the insurance policy 10 includes the stipulation that the consumer 12 maintains insurance (e.g., auto and/or liability insurance) or performs other contractual duties. If the consumer 12 fails to maintain insurance or perform other duties, the insurance issuer may pursue the consumer 12 for the cost of the insurance and/or the cost of satisfying the contractual duties.

In one example, the insurance policy 10 stipulates that the insurance issuer 22 may pursue the consumer 12 for a voluntary repossession. Voluntary repossession, for example, is simply dropping the vehicle 14 off in an attempt to obviate the loan or the lease. The insurance issuer 22, however, retains the right to seek reimbursement from the consumer 12 for the balance of the loan or the lease.

The description of the teachings and the various embodiments are merely exemplary in nature and, thus, variations that do not depart from the gist of the teachings are intended to be within the scope of the teachings. Such variations are therefore not to be regarded as a departure from the spirit and scope of the teachings.

What is claimed is:

1. A method of determining financing for a purchase or a lease of a depreciating asset for a purchaser or a lessee, the method comprising:
    electronically determining a credit worthiness on a computer based on the purchaser or the lessee;
    electronically establishing a finance contract on said computer for the purchase or the lease of the depreciating asset, said finance contract includes a dealer who is a seller or a lessor of the depreciating asset designated as a guarantor of said finance contract;
    determining a cost of an insurance policy, said dealer is designated as a beneficiary of said insurance policy, said cost of said insurance policy is based on a liability of said dealer being designated said guarantor of said finance contract, said liability of being designated said guarantor of said finance contract is based on at least said credit-worthiness and a value of the depreciating asset;
    determining a payment required of the purchaser or the lessee by said finance contract, said payment having a value based on a cost of the purchase or the lease of the depreciating asset and a cost of said insurance policy.

2. The method of claim 1, further comprising: recovering the depreciating asset from the purchaser or the lessee to a lender based on a payment default.

3. The method of claim 1, wherein said insurance policy has a face value based on said liability of said dealer being designated said guarantor of said finance contract.

4. The method of claim 1, further comprising: paying said value of said insurance policy only after transfer of the depreciating asset from the purchaser or the lessee to said lender after a predetermined period.

5. The method of claim 1, further comprising: reporting a payment history of said finance contract.

6. The method of claim 1, further comprising: determining said liability of said dealer being designated said guarantor of said finance contract based on a difference between a remaining balance owed on said finance contract by the purchaser or the lessee and a value of the depreciating asset over a period of said finance contract.

7. The method of claim 6, wherein said remaining balance owed on said finance contract includes a principal portion and an interest portion of the finance contract.

8. The method of claim 1, further comprising: paying a face value of said insurance policy to said dealer upon repossessing the depreciating asset.

9. The method of claim 1, further comprising: reimbursing said lender for costs of said finance contract.

10. A method of establishing a financing contract for purchase of a depreciating asset, the method comprising:
    electronically determining a value of the depreciating asset with a module;
    electronically determining a purchase price with said module;
    electronically determining a payment to a lender with said module;
    providing a finance contract from said lender for the purchase of the depreciating asset from a dealer in return for said payment to said lender;
    designating said dealer a guarantor of said finance contract and a beneficiary of an insurance agreement to cover default of said finance contract, said insurance agreement having a cost based on said dealer being designated said guarantor of said finance contract.

11. A method of electronically determining a financing arrangement between a lender, a purchaser and a dealer on a computer, the method comprising:
    electronically determining a value of an asset that depreciates over time with the computer;
    electronically preparing the financing arrangement with the computer for purchase or lease of said asset from the dealer;
    designating the dealer as a guarantor in the financing arrangement;
    electronically determining a value of an insurance agreement that reimburses the dealer costs of the financing arrangement when said asset is repossessed.

12. A method of electronically determining a cost of a purchase or a lease of a vehicle with a computer, the method comprising:
    providing a dealer that sells or leases the vehicle;
    providing a finance contract from a lender for sale of lease of the vehicle, said finance contract makes the dealer a guarantor of said finance contract when the dealer sells or leases the vehicle;
    electronically determining a first value with the computer, said first value defines a capitalized cost of the purchase or the lease of the vehicle;
    electronically determining a second value with the computer, said second value is descriptive of a credit worthiness indication of a purchaser or a lessee of the vehicle;
    determining a cost of an insurance agreement to reimburse the dealer the cost of being designated the guarantor when default occurs on the finance contract;
    electronically determining a purchase price or lease price of the vehicle with the computer, said purchase price or said lease price of the vehicle includes said cost of said insurance agreement based on at least said first value and said second value.

13. The financing system of claim 12 further comprising electronically determining a third value with the computer, said third value defines a residual value of the vehicle in a period of the lease, said cost of said insurance policy is also based on said third value.

14. The financing system of claim 12, wherein said credit worthiness indication includes a credit score.

15. The financing system of claim 12, wherein said purchase price is based on a scoring bias based on a chance that the asset will be repossessed.

* * * * *